US012614707B2

(12) United States Patent
Simmons et al.

(10) Patent No.: US 12,614,707 B2
(45) Date of Patent: Apr. 28, 2026

(54) PRECISE TUNING OF MCP-BASED ION DETECTOR USING ISOTOPE RATIOS WITH SOFTWARE CORRECTION

(71) Applicant: DH TECHNOLOGIES DEVELOPMENT PTE. LTD., Singapore (SG)

(72) Inventors: Douglas Arnold Simmons, Whitby (CA); Nicholas G. Bloomfield, Newmarket (CA); Wen Jin, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 348 days.

(21) Appl. No.: 18/559,759

(22) PCT Filed: May 3, 2022

(86) PCT No.: PCT/IB2022/054080

§ 371 (c)(1),
(2) Date: Nov. 8, 2023

(87) PCT Pub. No.: WO2022/243776

PCT Pub. Date: Nov. 24, 2022

(65) Prior Publication Data

US 2024/0242948 A1 Jul. 18, 2024

Related U.S. Application Data

(60) Provisional application No. 63/189,233, filed on May 17, 2021.

(51) Int. Cl.
*H01J 49/00* (2006.01)
*H01J 43/24* (2006.01)
(Continued)

(52) U.S. Cl.
CPC ........ *H01J 49/0009* (2013.01); *H01J 43/246* (2013.01); *H01J 43/30* (2013.01);
(Continued)

(58) Field of Classification Search
CPC ...... H01J 49/0009; H01J 43/246; H01J 43/30; H01J 49/0031; H01J 49/0036; H01J 49/025; H01J 49/0027
See application file for complete search history.

(56) References Cited

U.S. PATENT DOCUMENTS

2009/0108191 A1 4/2009 Yefchak et al.

OTHER PUBLICATIONS

International Search Report and Written Opinion for PCT/IB2022/054080, mailed Jul. 22, 2022.

*Primary Examiner* — Robert H Kim
(74) *Attorney, Agent, or Firm* — Potomac Law Group PLLC; Reza Mollaaghababa; Ido Rabinovitch

(57) ABSTRACT

A mass spectrometer that includes an MCP detector selects and analyzes a calibrant compound that has a first isotope and a second isotope with a known abundance ratio. The mass spectrometer measures the intensity of the first isotope that produces multiple-ion strikes at the MCP detector and the intensity of the second isotope that produces single-ion strikes at the MCP detector while the bias voltage of the MCP detector is stepped through a sequence of one or more different voltages. At each step, the ratio of the measured intensities is compared to the known abundance ratio for the two isotopes. When the measured ratio is within a predetermined threshold of the known abundance ratio, an optimum voltage for the MCP detector is calculated using one or more measured ratios calculated for voltages of the sequence of voltages.

15 Claims, 6 Drawing Sheets

(51) Int. Cl.
*H01J 43/30* (2006.01)
*H01J 49/02* (2006.01)

(52) U.S. Cl.
CPC ...... *H01J 49/0031* (2013.01); *H01J 49/0036* (2013.01); *H01J 49/025* (2013.01)

100

500

PRECISE TUNING OF MCP-BASED ION DETECTOR USING ISOTOPE RATIOS WITH SOFTWARE CORRECTION

RELATED APPLICATIONS

This application claims the benefit of U.S. Provisional Patent Application Ser. No. 63/189,233, filed on May 17, 2021, the content of which is incorporated by reference herein in its entirety.

INTRODUCTION

The teachings herein relate to calculating an optimum bias voltage for a microchannel plate (MCP) detector of a mass spectrometer based on an isotope ratio. More specifically, systems and methods are provided to measure the intensities of two isotopes of a calibrant compound, calculate the ratio of the intensities, and compare the ratio to the known abundance ratio of the two isotopes as the bias voltage of the MCP detector is varied.

The systems and methods herein can be performed in conjunction with a processor, controller, or computer system, such as the computer system of FIG. 1.

Problem of Determining an Optimum Bias Voltage for an MCP Detector

FIG. 2 is an exemplary diagram 200 of an MCP detector upon which embodiments of the present invention may be implemented. The MCP detector includes one or more microchannel plates 210, anode 220, and amplifier 230. A bias voltage 215 is applied from the front of one or more plates 210 to the back of one or more plates 210. A negative bias voltage 215 attracts, for example, positive ions 201 to the front of one or more microchannel plates 210. Ions 201 enter the angled microchannels of the first plate of one or more plates 210 and impact the walls of the angled microchannels causing a cascade of electrons to be emitted from the back of the first plate. Electrons emitted from each preceding plate impact the following plate multiplying again the number of electrons produced.

Finally, the back of the last plate of one or more plates 210 emits electrons that are received by anode 220, which collects the measured electrical signal of the electrons. The measured electrical signal can be amplified using amplifier 230, for example.

Bias voltage 215 is divided across the plates of one or more plates 210 and attracts the cascading electrons between plates and eventually to anode 220. Unfortunately, each plate of one or more plates 210 holds only a finite amount of charge (electrons). As a result, each of these plates eventually wears out and has to be replaced, particularly the last plate, which produces the most amount of charge.

The amount of charge produced by one or more plates 210 is directly proportional to bias voltage 215. As a result, applying an optimal bias voltage 215 can extend the life of one or more plates 210. The process of determining an optimal bias voltage 215 for mass spectrometry experiments conducted with the MCP detector is referred to as "tuning" the MCP detector.

Conventionally, MCP detector tuning has been performed using a simple calibration method in which the total ion current (TIC) is measured. For example, a mass spectrometer selects a broad mass range (tens or hundreds of m/z) of a calibration sample and measures the TIC using different MCP bias voltages. The MCP bias voltage is initially set to 25 or 50 V and is increased in steps of 25 or 50 V, for example.

With each increase in the MCP bias voltage, the increase in the measured TIC is compared to a predetermined percentage increase. For example, if the predetermined percentage increase is 13%, and the next 25 or 50 V increase in the MCP bias voltage does not produce a more than a 13% increase in the measured TIC, then the calibration method is stopped and the last MCP bias voltage is used for all subsequent experimentation as the optimum or "tuned" MCP bias voltage.

Unfortunately, this tuning method for MCP-based detectors in time-of-flight (TOF) systems is a low resolution or coarse approach that can leave the detector in an unpredictable state. The state is unpredictable in that the fraction of single-ion detection events that fall below the detection threshold is not precisely known. This can lead to inaccuracies in isotope ratios and quantitation. In addition, in some cases, it can also result in the detector being run at a higher MCP bias voltage than necessary leading to a reduction of MCP lifetime. For example, it has been estimated that a 50 V reduction in MCP bias voltage can double the lifespan of a detector.

Consequently, there is a need for additional systems and methods for tuning the MCP detector of a mass spectrometer to determine an optimum MCP bias voltage of the detector.

Mass Spectrometry Background

Mass spectrometers are often coupled with separation devices, such as chromatography devices, or sample introduction devices in order to identify and characterize compounds of interest from a sample or to analyze multiple samples. In such a coupled system, the eluting or injected sample is ionized and a series of mass spectra are obtained from the eluting sample at specified time intervals called retention times. These retention times range from, for example, 1 second to 100 minutes or greater. The series of mass spectra form a chromatogram, or extracted ion chromatogram (XIC).

Peaks found in the XIC are used to identify or characterize a known peptide or compound in a sample, for example. More particularly, the retention times of peaks and/or the area of peaks are used to identify or characterize (quantify) a known peptide or compound in the sample. In the case of multiple samples provided over time by a sample introduction device, the retention times of peaks are used to align the peaks with the correct sample.

In traditional separation coupled mass spectrometry systems, a precursor ion or a product ion of a known compound is selected for analysis. In mass spectrometry (MS) a precursor ion is selected. An MS scan is then performed at each interval of the separation for a mass range that includes the precursor ion. The intensity of the precursor found in each MS scan is collected over time and analyzed as a collection of spectra, or an XIC, for example. In general, an MS scan involves ionization of one or more compounds from a sample, selection of one or more precursor ions of the one or more compounds, and mass analysis of the precursor ions.

In tandem mass spectrometry or mass spectrometry/mass spectrometry (MS/MS) a product ion is selected. An MS/MS scan is then performed at each interval of the separation for a mass range that includes the product ion. The intensity of the product ion found in each MS/MS scan is collected over time and analyzed as a collection of spectra, or an XIC, for example. An MS/MS scan involves ionization of one or more compounds from a sample, selection of one or more precursor ions of the one or more compounds, fragmentation of the one or more precursor ions into fragment or product ions, and mass analysis of the product ions.

Both MS and MS/MS can provide qualitative and quantitative information. In MS/MS, the product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In a targeted acquisition method, a list of transitions is typically interrogated during each cycle time. In order to decrease the number of transitions that are interrogated at any one time, some targeted acquisition methods have been modified to include a retention time or a retention time range for each transition. Only at that retention time or within that retention time range will that particular transition be interrogated. One targeted acquisition method that allows retention times to be specified with transitions is referred to as scheduled MRM.

MRM experiments are typically performed using "low resolution" instruments that include, but are not limited to, triple quadrupole (QqQ) or quadrupole linear ion trap (QqLIT) devices. With the advent of "high resolution" instruments, there was a desire to collect MS and MS/MS using workflows that are similar to QqQ/QqLIT systems. High-resolution instruments include, but are not limited to, quadrupole time-of-flight (QqTOF) or orbitrap devices. These high-resolution instruments also provide new functionality.

MRM on QqQ/QqLIT systems is the standard mass spectrometric technique of choice for targeted quantification in all application areas, due to its ability to provide the highest specificity and sensitivity for the detection of specific components in complex mixtures. However, the speed and sensitivity of today's accurate mass systems have enabled a new quantification strategy with similar performance characteristics. In this strategy (termed MRM high resolution (MRM-HR) or parallel reaction monitoring (PRM)), looped MS/MS spectra are collected at high-resolution with short accumulation times, and then fragment ions (product ions) are extracted post-acquisition to generate MRM-like peaks for integration and quantification. With instrumentation like the TRIPLETOF® Systems of AB SCIEX™, this targeted technique is sensitive and fast enough to enable quantitative performance similar to higher-end triple quadrupole instruments, with full fragmentation data measured at high resolution and high mass accuracy.

In other words, in methods such as MRM-HR, a high-resolution precursor ion mass spectrum is obtained, one or more precursor ions are selected and fragmented, and a high-resolution full product ion spectrum is obtained for each selected precursor ion. A full product ion spectrum is collected for each selected precursor ion but a product ion mass of interest can be specified and everything other than the mass window of the product ion mass of interest can be discarded.

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the MS/MS$^{ALL}$ method, all the precursor ions in each precursor ion mass selection window are fragmented, and all of the product ions of all of the precursor ions in each mass selection window are mass analyzed.

SUMMARY

A system, method, and computer program product are disclosed for calculating an optimum bias voltage for an MCP detector of a mass spectrometer. The system includes an ion source device, a mass spectrometer, and a processor.

The ion source device continuously receives and ionizes a calibration sample containing a known compound, producing an ion beam. The known compound is selected to include at least a first isotope and a second isotope with a known abundance ratio.

The mass spectrometer includes an MCP detector. The mass spectrometer receives the ion beam from the ion source device. The mass spectrometer selects and mass analyzes a mass range that includes a first ion (the first isotope) and a second ion (the second isotope). The mass spectrometer controls the ion beam so that the MCP detector detects only multiple-ion strikes (i.e. ion detection events resulting from the impact of two or more ions on the detector) for the first ion and only single-ion strikes (i.e. ion detection events resulting from the impact of one ion on the detector) for the second ion. The mass spectrometer produces one or more mass spectra for the mass range as a bias voltage of the MCP detector is stepped through a sequence of one or more different voltages that affect the number of the first ion and the number of the second ion that the MCP detector detects.

The processor performs a number of steps for each voltage of the sequence of voltages. The processor determines the intensity of the first ion and the intensity of the second ion from the one or more mass spectra. The processor calculates a measured ratio of the first intensity and the second intensity. Note that the ratio of the second intensity and the first intensity can also be used.

The processor compares the measured ratio to the known abundance ratio. Finally, when the measured ratio is within a predetermined threshold of the known abundance ratio, the processor calculates an optimum voltage for the MCP detector using one or more measured ratios calculated for voltages of the sequence of voltages.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
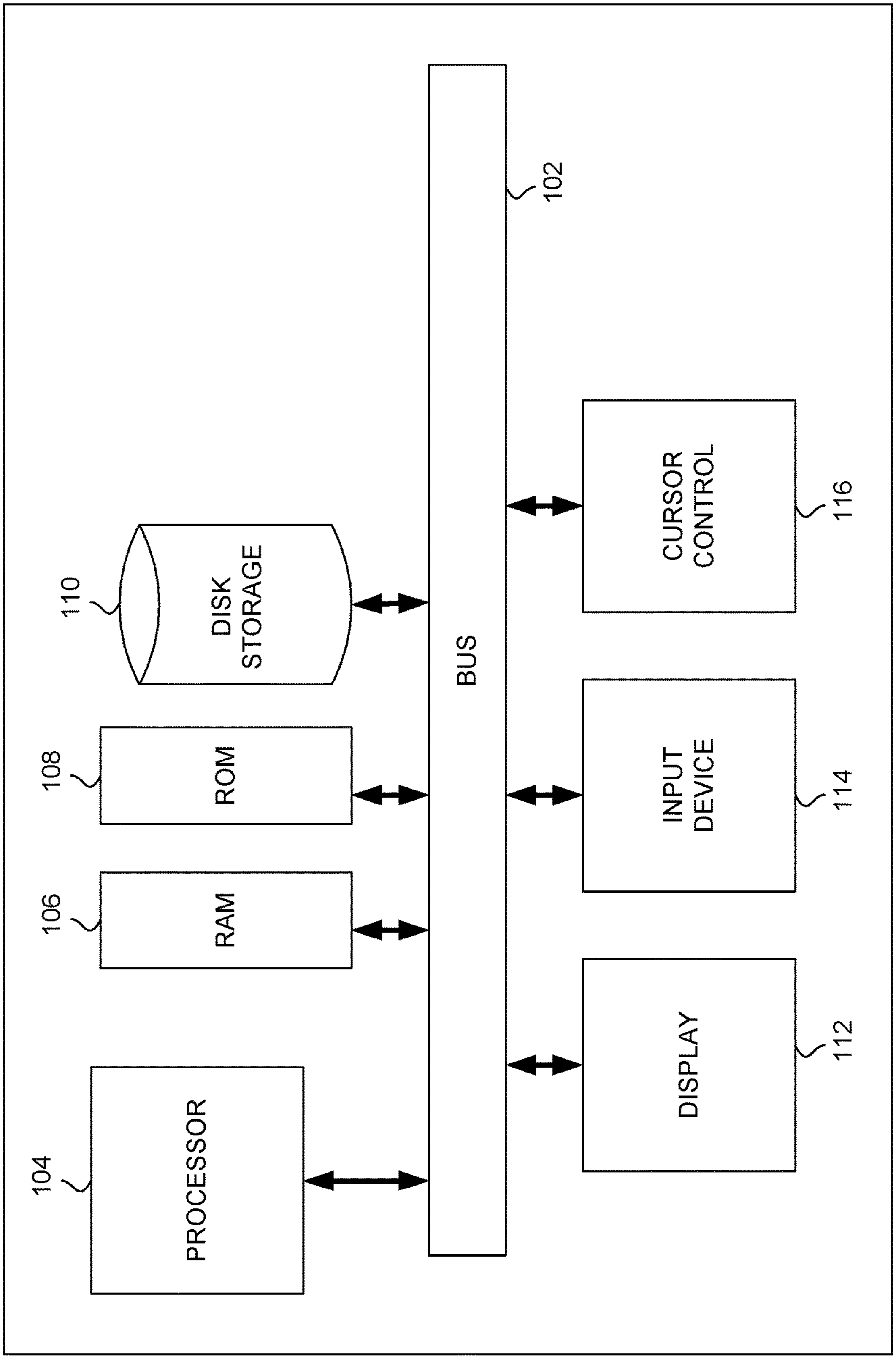
FIG. 1 is a block diagram that illustrates a computer system, upon which embodiments of the present teachings may be implemented.
Figure 2:
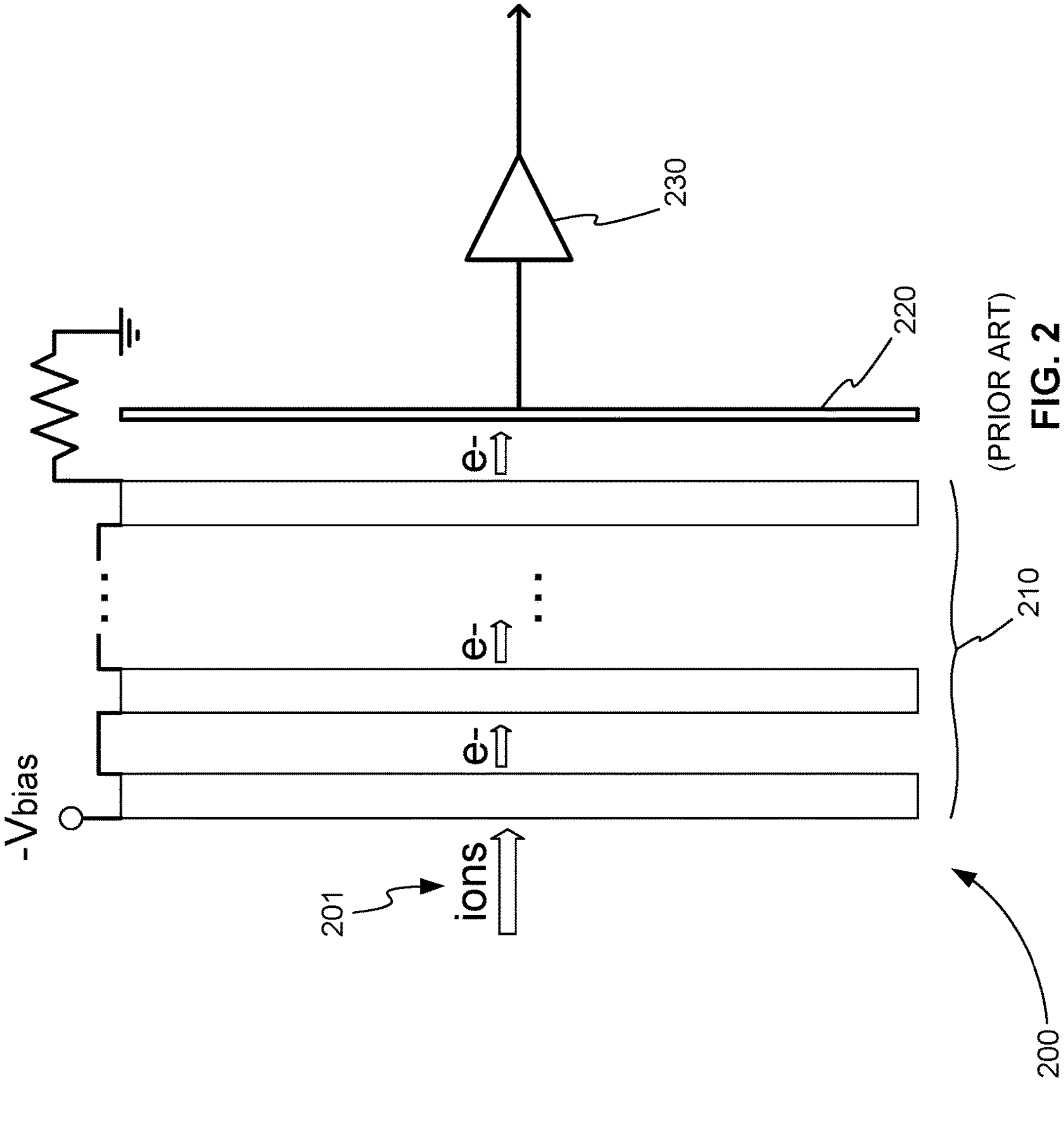
(PRIOR ART) FIG. 2
FIG. 2 is an exemplary diagram of an MCP detector upon which embodiments of the present invention may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

The term "computer-readable medium" or "computer program product" as used herein refers to any media that participates in providing instructions to processor 104 for execution. The terms "computer-readable medium" or "computer program product" are used interchangeably throughout this written description. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Optimum MCP Bias Voltage Calculated from Isotope Ratio

Embodiments of systems and methods for calculating an optimum bias voltage for a microchannel plate (MCP) detector of a mass spectrometer are provided herein, which includes the accompanying Appendix 1. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and remain within the spirit and scope of embodiments of the present invention.

Appendix 1 is an exemplary list of procedures for calculating an optimum bias voltage for an MCP detector of a mass spectrometer, in accordance with various embodiments.

As described above, the plates of an MCP detector hold a finite amount of charge. As a result, these plates eventually wear out and have to be replaced. The amount of charge produced by these plates is directly proportional to the bias voltage applied to the MCP detector. As a result, the life of an MCP detector can be extended by applying an optimal bias voltage to the MCP detector. The process of determining an optimal bias voltage for the MCP detector is referred to as tuning.

Conventionally, MCP detector tuning had been performed using a simple calibration method in which the total ion current (TIC) is measured. Unfortunately, this tuning method for MCP-based detectors in time-of-flight (TOF) systems can leave the detector in an unpredictable state and can lead to inaccuracies in isotope ratios and quantitation. In addition, in some cases, it can also result in the detector being run at a higher MCP bias voltage than necessary leading to a reduction of MCP detector lifetime.

Consequently, there is a need for additional systems and methods for tuning the MCP detector of a mass spectrometer to determine an optimum MCP bias voltage of the detector.

In various embodiments, isotope ratios are used to tune an MCP detector. Using isotope ratios allows the fraction of single-ion detection events that fall below a threshold value to be tuned precisely. In addition to the benefits to linearity/quantitation, knowledge of the accurate and precise fraction of single-ion losses makes it possible to use software to correct for it. This allows detectors to be tuned at lower MCP bias voltages which improves linear dynamic range and lifetime while having minimal effect on sensitivity. The overall impact is better isotope ratios, quantitation, and longer MCP detector lifetime. Furthermore, the software correction can be applied in a way that accounts for the differences in detection efficiency across the mass range, which is difficult to account for with hardware. This type of correction is not possible with conventional tuning that relies on measuring the TIC, since in this conventional approach the fraction of undetected events is not known accurately.

In various embodiments, the precisely known natural abundances of isotopes are used to tune the detector to a user-defined response rate for single-ion detection events. In various embodiments, any two peaks with the correct, known ratios can also be used. In other words, natural isotopes do not have to be used. The underlying assumption is that multiple-ion detection events ($n>1$ ion strikes) are detected at near-100% efficiency, and single-ion detection events ($n=1$ ion strikes) are detected with a lower efficiency that can be adjusted by manipulating the MCP bias voltage.

Two peaks with known ratios are used and their ion flux is adjusted such that a first isotope ("the reference isotope") is in a regime almost entirely comprised of observations coming from $n>1$ ion strikes. The first isotope can be the most abundant, for example. Simultaneously, the ion flux for a second isotope ("the measured isotope") is adjusted so that the second isotope is in a regime with observations almost exclusively coming from $n=1$ ion strikes. The MCP bias voltage is then adjusted to manipulate the ratio of the intensities of the measured isotope peak and the reference isotope peak to a user-defined threshold level.

Since the true ratio of the two isotopes is known through natural isotope abundances, the precise portion lost due to non-detection can also be determined. In one embodiment, software is used to correct the signal intensities for a known proportion of losses of single-ion detection events (e.g., 12%). With this 12% software correction active, the MCP bias voltage is tuned such that the observed error in isotope ratios is 0% plus or minus 1%. In this case, therefore, the detector is tuned in such a way that 12% of single-ion events are undetected, as averaged across all detector channels. The portion of undetected events can be adjusted easily by changing the correction applied by the software prior to tuning. In practice, the larger the software correction, the lower the resulting MCP bias voltage.

In various embodiments, the amount of software correction applied is made mass-dependent to account for the known behavior that lower mass ions experience a higher detection efficiency. For example, for a particular mass spectrometer, it is known that 12% of the single-ion arrivals for isotopes on the order of 800 m/z are lost. However, 0% of the single-ion arrivals for isotopes on the order of 100 m/z are lost. In other words, it is known that fewer single ion detection events are lost at lower mass than at higher mass. Consequently, both software correction and the user-defined threshold level of the ratio of the intensities of the two isotopes are mass-dependent.

In an exemplary tuning method that is in accordance with various embodiments, a calibration sample is prepared with a known compound that includes a first ion for the first (reference) isotope at 829.54 m/z and a second ion for the second (measured) isotope at 833.55 m/z. Further, it is known that the selected known compound has no isotopes with an ion at 834.0 m/z. In other words, the chemical background can be measured at 834.0 m/z.

The calibration sample is analyzed using either TOF-MS or TOF-MS/MS with low collision energy. TOF-MS/MS with low collision energy is preferred, for example, to eliminate chemical noise during the calibration method.

To begin, an initial bias voltage, $V_i$, for the MCP detector of a mass spectrometer is determined. This is determined using the conventional tuning method described above. This method is based on measuring the TIC as the bias voltage is increase in 25 or 50 V increments.

Next, the attenuation of the ion beam of the mass spectrometer is adjusted so that the measured intensity of the first ion at 829.54 m/z is within a known range of between $2.8\times10^5$ counts per second (cps) and $3.0\times10^5$ cps, for a specific mass spectrometer example. It is known that when the intensity of an ion of the first isotope is in this range, only or close to 100% of multiple-ion strikes are being detected for the first isotope and only or close to 100% of single-ion strikes are being detected for the second isotope.

In other words, the lower bound of the range, $2.8\times10^5$ cps, ensures that ions of the first isotope are being detected only as multiple-ion detection events, and the upper bound of the range, $3.0\times10^5$ cps, ensures that ions of the second isotope are being detected only as single-ion detection events. In other words, the upper bound and knowledge of the relative natural abundance of the isotopes ensures that the intensity of the second isotope is low enough to be comprised amost entirely of single-ion detection events. Note that multiple-ion detection events are synonymous with multiple-ion strikes and single-ion detection events are synonymous with single-ion strikes.

As a result, adjusting the attenuation of the ion beam ensures that only multiple-ion strikes are being detected for the first isotope, and only single-ion strikes are being detected for the second isotope. With instrumentation like the TRIPLETOF® Systems of AB SCIEX™, for example, the attenuation of the ion beam is adjusted by changing an ion transmission control (ITC) parameter. This parameter causes one or more lenses gating the ion beam to be adjusted, for example.

After the attenuation of the ion beam is adjusted, the bias voltage is more finely tuned based on the ratio of the intensities of the ions of the two isotopes. For example, the bias voltage of the MCP detector is gradually ramped down from the initial bias voltage, $V_i$, in 5 V steps, $\Delta V$. At each $\Delta V$ step, spectral data is collected for a predetermined time period, such as 30 seconds.

At each $\Delta V$ step, an XIC summed intensity is extracted from the spectral data for the first ion at 829.54 m/z, the second ion at 833.55 m/z, and the background at 834.0 m/z. The extraction window width is 0.1 m/z, for example. The XIC summed intensity of the background at 834.0 m/z is subtracted from the XIC summed intensity of the first ion at 829.54 m/z and the second ion at 833.55 m/z.

At each $\Delta V$ step, a percent isotope abundance error is calculated from the background-subtracted XIC summed intensity of the first ion at 829.54 m/z and the second ion at 833.55 m/z, and the known natural abundance ratio of the first isotope and the second isotope. For example, the known natural abundance ratio of the second isotope to the first isotope is 0.429. The percent isotope abundance error is then calculated from $$\frac{\dfrac{\text{background-subtracted intensity at } 833.55\ m/z}{\text{background} - \text{subtracted intensity } 829.54\ m/z} - 0.429}{0.429} \times 100\%.$$

If the percent isotope abundance error is below a target percent abundance error for two consecutive voltages, the ramp down in bias voltage is stopped. The precise bias voltage of the MCP detector is then found using a linear fit to the last four percent isotope abundance errors calculated. The precise bias voltage is the voltage where the percent isotope abundance error of the linear fit is the target percent abundance error.

Note that if software correction is not used for the measurement of single-ion strikes, the target percent abundance error is −12%. If software correction is used for the measurement of single-ion strikes the target percent abundance error is 0%. In other words, if the software intensity correction is not active during the measurement then the detector is tuned to a user-defined target % ion loss (e.g. 12%). If the software intensity correction is active then presumably 0% error is the target. Note also, as described above, the software correction is mass-dependent. So, if software correction is not used, the target percent abundance error can be a value other than −12% depending on the mass or m/z values of the isotopes measured.

Figure 3:
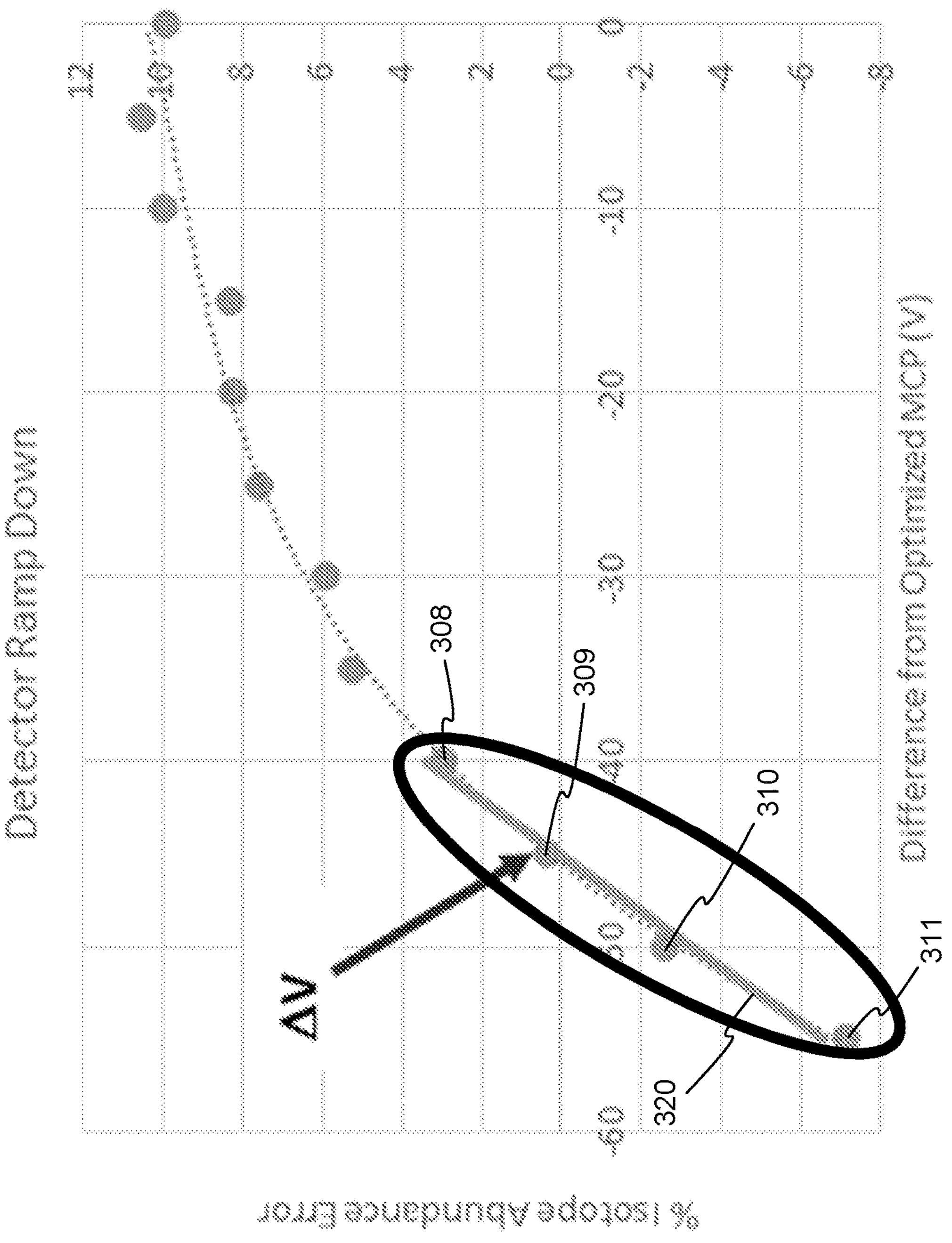
FIG. 3 is an exemplary plot of percent isotope abundance error versus decrease in voltage from the initial voltage for the exemplary tuning method showing the linear fit to the last four percent isotope abundance errors calculated, in accordance with various embodiments.

FIG. 3 is an exemplary plot 300 of percent isotope abundance error versus decrease in voltage from the initial voltage for the exemplary tuning method showing the linear fit to the last four percent isotope abundance errors calculated, in accordance with various embodiments. The linear fit of the last 4 points is only one way of determining the precise optimal voltage. In various embodiments, interpolation, a curve fit, or other methods can be used.

FIG. 3 shows the percent isotope abundance error calculated at the initial voltage, $V_i$, determined from conventional tuning and at eleven different bias voltages as the bias voltage is decreased in eleven 5 V steps from the initial voltage.

Tenth calculated percent isotope abundance error 310 and the eleventh calculated percent isotope abundance error 311 are below the target percent abundance error, 0%, for two consecutive voltages. As a result, the mass analysis of the exemplary tuning method is stopped after eleventh percent isotope abundance error 311 is calculated.

A linear fit to the last four percent isotope abundance errors 308, 309, 310, and 311 produces line 320. The precise bias voltage is the voltage where the percent isotope abundance error of line 320 is the target percent abundance error, 0%. This precise bias voltage is −45 V from the initial voltage according to FIG. 3.

Note that the data shown in FIG. 3 is calculated from measurements that use software correction to account for a loss of 12% of the single-ion strikes. As a result, the target percent abundance error in FIG. 3 is 0%. So, FIG. 3 shows how the MCP detector is tuned to software corrected measurements. When the percent isotope abundance error is calculated from measurements that have not used software correction, the target percent abundance error is the percent known loss of single-ion strikes for the mass used.

System for Calculating Optimum MCP Bias Voltage

Figure 4:
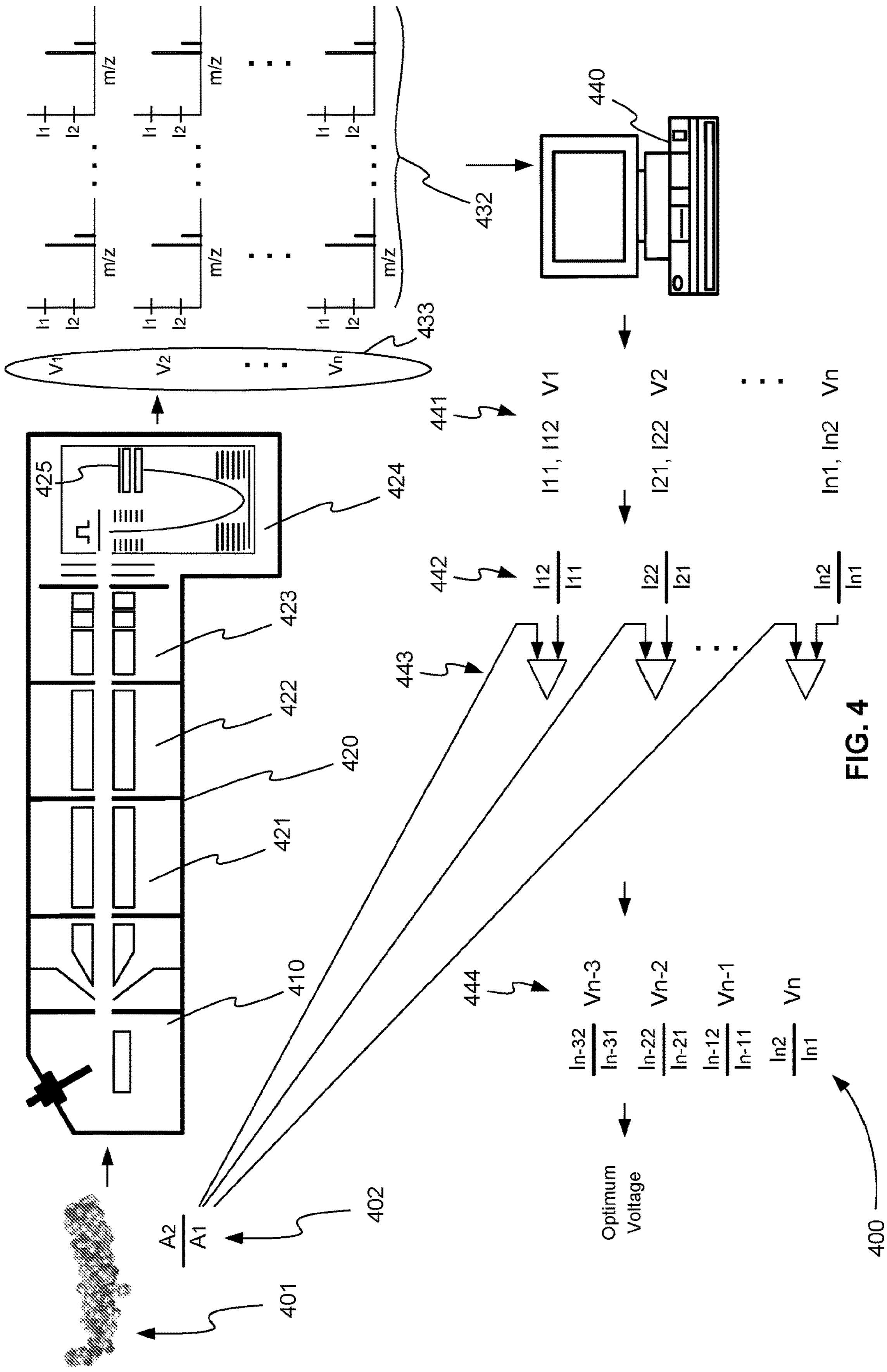
FIG. 4 is an exemplary diagram showing a system for calculating an optimum bias voltage for an MCP detector of a mass spectrometer, in accordance with various embodiments.

FIG. 4 is an exemplary diagram 400 showing a system for calculating an optimum bias voltage for an MCP detector of a mass spectrometer, in accordance with various embodiments. The system of FIG. 4 includes ion source device 410, mass spectrometer 420, and processor 440.

Ion source device 410 continuously receives and ionizes a calibration sample containing known compound 401, producing an ion beam. Known compound 401 is selected to include at least a first isotope and a second isotope with a known abundance ratio 402.

Mass spectrometer 420 includes mass analyzer 424, which is, for example, a TOF mass analyzer. Mass analyzer 424 includes MCP detector 425. Mass spectrometer 420 can also include mass filter 421, fragmentation device 422, and ion guide 423, for example. Mass spectrometer 420 receives the ion beam from ion source device 410.

Mass spectrometer 420 selects and mass analyzes a mass range that includes a first ion of the first isotope and a second ion of the second isotope. Mass spectrometer 420 controls the ion beam so that MCP detector 425 detects only multiple-ion strikes for the first ion and only single-ion strikes for the second ion. Mass spectrometer 420 produces one or more mass spectra 432 for the mass range as a bias voltage of MCP detector 425 is stepped through a sequence of one or more different voltages 433 that affect the number of the first ion and the number of the second ion that MCP detector 425 detects.

Processor 440 can be, but is not limited to, a computer, a microprocessor, the computer system of FIG. 1, or any device capable of sending and receiving control signals and data to and from mass spectrometer 420 and processing data. Processor 440 is in communication with mass spectrometer 410.

Processor 440 performs a number of steps for each voltage of sequence of voltages 433. In step 441, processor 440 determines a first intensity of the first ion and a second intensity of the second ion from one or more mass spectra 432. As described above, for example, the first intensity and the second intensity can be determined from XIC summed intensities extracted from one or more mass spectra 432. In step 442, processor 440 calculates a measured ratio of the first intensity and the second intensity. In step 443, processor 440 compares the measured ratio to known abundance ratio 402.

Finally, in step 444, when the measured ratio is within a predetermined threshold of known abundance ratio 402, processor 440 calculates an optimum voltage for MCP detector 424 using one or more measured ratios calculated for voltages of sequence of voltages 433. For example, as shown in step 444, FIG. 3, and as described below, the optimum voltage for MCP detector 424 may be found from the last four voltages and their measured ratios. In addition, in various embodiments, when the measured ratio is within a predetermined threshold of known abundance ratio 402, processor 440 instructs mass spectrometer 420 to stop the analysis of the known compound.

In various embodiments, processor 440 subtracts the background intensity from the intensities of the isotopes before calculating the measured ratio. Specifically, the mass range is selected to further include a background m/z value where it is known that no isotope of known compound 401 is located. Processor 440 then performs a number of additional steps for each voltage of sequence of voltages 433. Processor 440 determines a background intensity for the background m/z value. For example, the background intensity can be determined from an XIC summed intensity extracted from one or more mass spectra 432. Processor 440 then subtracts the background intensity from the first intensity and the second intensity before calculating the measured ratio.

In various embodiments, processor 440 calculates a measured ratio and compares the measured ratio to known abundance ratio 402 by calculating a percent isotope abundance error from the measured ratio and known abundance ratio 402. For example, the percent isotope abundance error is calculated according to $$\frac{(\text{measured ratio} - \text{known abundance ratio})}{\text{known abundance ratio}} \times 100\%$$

In various embodiments, as shown in FIG. 3, the predetermined threshold of known abundance ratio 402 is related to a target percent abundance error. Specifically, the measured ratio is within a predetermined threshold of known abundance ratio 402 when the percent isotope abundance error is below a target percent abundance error for two or more consecutive voltages of the sequence of voltages. The target percent abundance error is 0% in FIG. 3, for example.

In various embodiments, also as shown in FIG. 3, an optimum voltage for MCP detector 425 is found from a linear fit of percent isotope abundance error values. Specifically, processor 440 calculates an optimum voltage for MCP detector 425 by calculating a linear fit of the calculated percent isotope abundance error values for at least the last four voltages of sequence of voltages 433 and calculating the optimum voltage as a voltage where the linear fit produces the target percent abundance error.

In various embodiments, as described above, if no software correction is applied in the measurement of single ion strikes, the target percent abundance error can be a nonzero value. For example, the target percent abundance error can be −12% for compounds with ions on the order of 800 m/z.

In various embodiments, as described above, if software correction is applied in the measurement of single ion strikes, the target percent abundance error can be 0%.

In various embodiments, the mass spectrometer performs MS. In this case, the one or more mass spectra include precursor ion mass spectra.

In various embodiments, the mass spectrometer performs MS/MS by, after selecting the mass range and before mass analyzing the mass range, further fragmenting the mass range. In this case, the one or more mass spectra include product ion mass spectra. Performing MS/MS is a preferred embodiment since it can help eliminate chemical noise.

In various embodiments, each voltage of sequence of voltages 433 includes an initial voltage, $V_i$.

In various embodiments, mass spectrometer 420 further, before mass analyzing the mass range, calculates the initial voltage, $V_i$, by stepping through an initial sequence of one or more different increasing bias voltages applied to MCP detector 425 and measuring the TIC for each voltage of the initial sequence of voltages using MCP detector 425. Processor 440 further performs a number of steps for each voltage of the initial sequence of voltages. Processor 440 receives the measured TIC. Processor 440 compares the TIC to an immediately preceding measured TIC. Finally, when the measured TIC is within a predetermined TIC threshold of the immediately preceding measured TIC, processor 440 calculates the initial voltage, $V_i$, as the voltage of the initial sequence of voltages used to obtain the measured TIC.

In various embodiments, mass spectrometer 420 controls the ion beam so that MCP detector 425 detects only multiple-ion strikes for the first ion and only single-ion strikes for the second ion by adjusting attenuation of the ion beam. Specifically, mass spectrometer 420 adjusts the attenuation of the ion beam until an intensity of the first ion measured by the MCP is within a predetermined range known to produce only multiple-ion strikes for the first ion and only single-ion strikes for the second ion.

In various embodiments, processor 440 further stores the optimum voltage for MCP detector 424 in a memory (not shown) so that this voltage is used for all subsequent experimentation.

Method for Calculating Optimum MCP Bias Voltage

Figure 5:
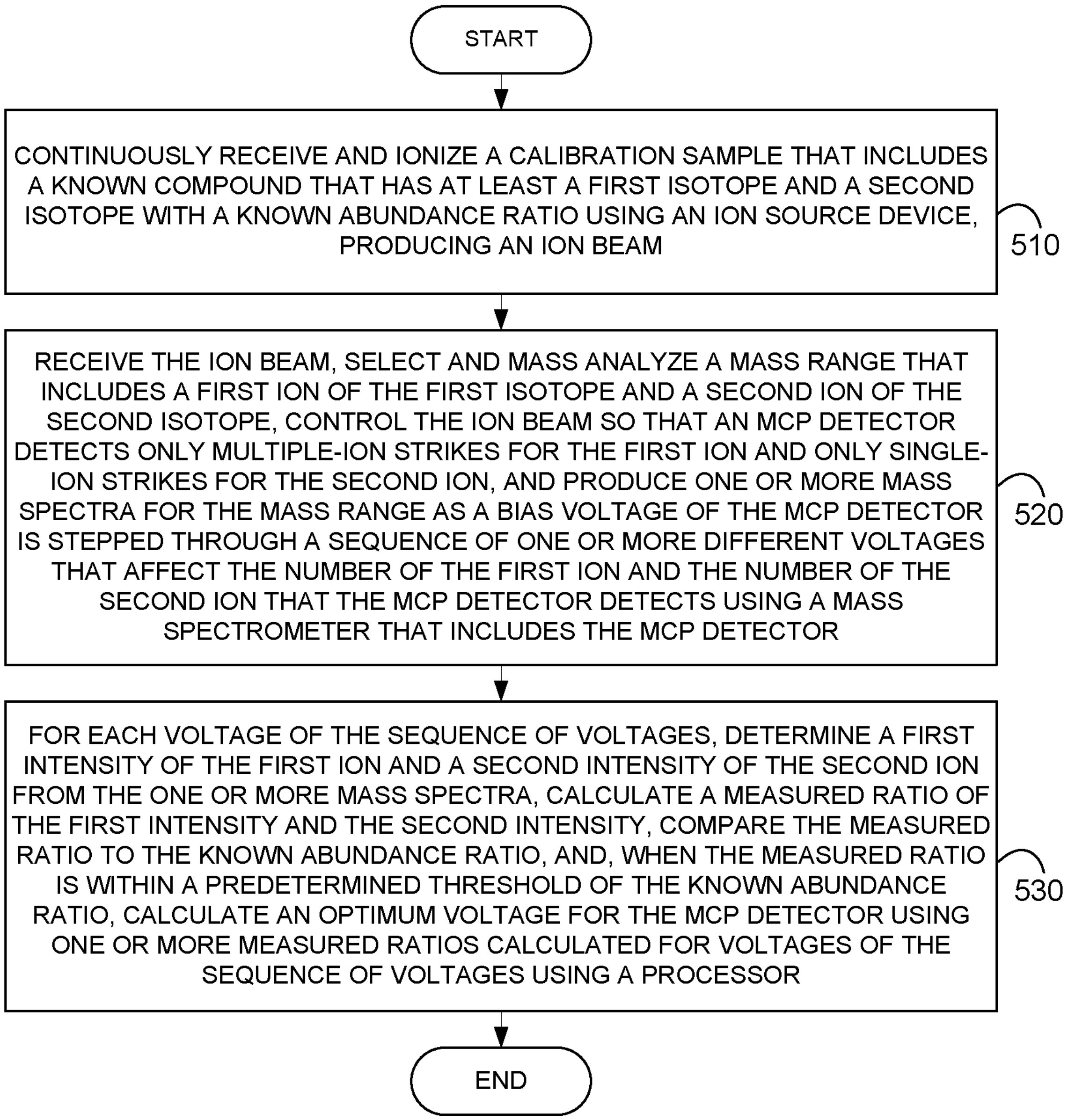
FIG. 5 is a flowchart showing a method for calculating an optimum bias voltage for an MCP detector of a mass spectrometer, in accordance with various embodiments.

FIG. 5 is a flowchart 500 showing a method for calculating an optimum bias voltage for an MCP detector of a mass spectrometer, in accordance with various embodiments.

In step 510 of method 500, a calibration sample is continuously received and ionized using an ion source device. The calibration sample includes a known compound that has at least a first isotope and a second isotope with a known abundance ratio.

In step 520, the ion beam is received using a mass spectrometer the includes an MCP detector. The mass spectrometer selects and mass analyzes a mass range that includes a first ion of the first isotope and a second ion of the second isotope. The mass spectrometer controls the ion beam so that the MCP detector detects only multiple-ion strikes for the first ion and only single-ion strikes for the second ion. The mass spectrometer produces one or more mass spectra for the mass range as a bias voltage of the MCP detector is stepped through a sequence of one or more different voltages that affect the number of the first ion and the number of the second ion that the MCP detector detects.

In step 530, a processor performs a number of steps for each voltage of the sequence of voltages. The processor determines a first intensity of the first ion and a second intensity of the second ion from the one or more mass spectra. The processor calculates a measured ratio of the first intensity and the second intensity. The processor compares the measured ratio to the known abundance ratio. Finally, when the measured ratio is within a predetermined threshold of the known abundance ratio, the processor calculates an optimum voltage for the MCP detector using one or more measured ratios calculated for voltages of the sequence of voltages.

Computer Program Product for Calculating Optimum MCP Bias Voltage

In various embodiments, a computer program product includes a non-transitory tangible computer-readable storage medium whose contents include a program with instructions being executed on a processor so as to perform a method for calculating an optimum bias voltage for an MCP detector of a mass spectrometer. This method is performed by a system that includes one or more distinct software modules.

Figure 6:
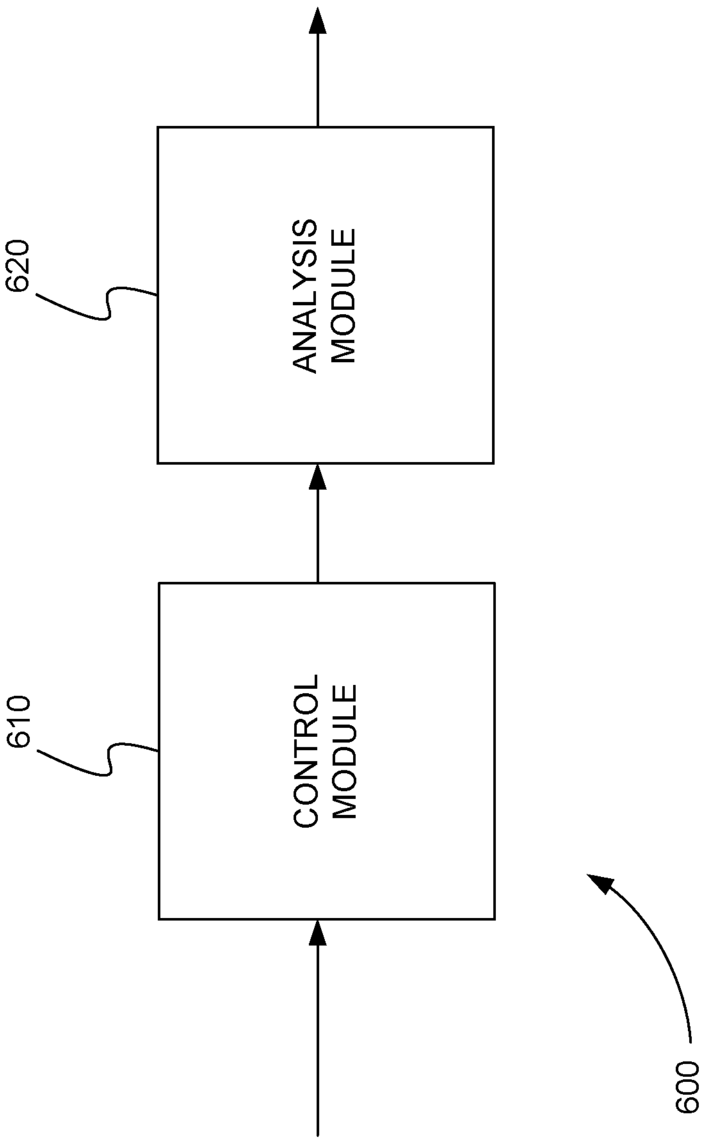
FIG. 6 is a schematic diagram of a system that includes one or more distinct software modules that performs a method for calculating an optimum bias voltage for an MCP detector of a mass spectrometer, in accordance with various embodiments.

FIG. 6 is a schematic diagram of a system 600 that includes one or more distinct software modules that performs a method for calculating an optimum bias voltage for an MCP detector of a mass spectrometer, in accordance with various embodiments. System 600 includes control module 610 and analysis module 620.

Control module 610 instructs an ion source device to continuously receive and ionize a calibration sample, producing an ion beam. The calibration sample includes a known compound that has at least a first isotope and a second isotope with a known abundance ratio.

Control module 610 instructs a mass spectrometer that includes an MCP detector to receive the ion beam. Control module 610 instructs the mass spectrometer to select and mass analyze a mass range that includes a first ion of the first isotope and a second ion of the second isotope. Control module 610 instructs the mass spectrometer to control the ion beam so that the MCP detector detects only multiple-ion strikes for the first ion and only single-ion strikes for the second ion. Control module 610 instructs the mass spectrometer to produce one or more mass spectra for the mass range as a bias voltage of the MCP detector is stepped through a sequence of one or more different voltages that affect the number of the first ion and the number of the second ion that the MCP detector detects.

Analysis module 620 performs a number of steps for each voltage of the sequence of voltages. Analysis module 620 determines a first intensity of the first ion and a second intensity of the second ion from the one or more mass spectra. Analysis module 620 calculates a measured ratio of the first intensity and the second intensity. Analysis module 620 compares the measured ratio to the known abundance ratio. When the measured ratio is within a predetermined threshold of the known abundance ratio, analysis module 620 calculates an optimum voltage for the MCP detector using one or more measured ratios calculated for voltages of the sequence of voltages.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for calculating an optimum bias voltage for a microchannel plate (MCP) detector of a mass spectrometer, comprising:

an ion source device that continuously receives and ionizes a calibration sample that includes a known compound that has at least a first isotope and a second isotope with a known abundance ratio, producing an ion beam;

a mass spectrometer that includes an MCP detector, receives the ion beam, selects and mass analyzes a mass range that includes a first ion of the first isotope and a second ion of the second isotope, controls the ion beam so that the MCP detects only multiple-ion strikes for the first ion and only single-ion strikes for the second ion, and produces one or more mass spectra for the mass range as a bias voltage of the MCP is stepped through a sequence of one or more different voltages that affect the number of the first ion and the number of the second ion that the MCP detects; and a processor in communication with the mass spectrometer that, for each voltage of the sequence of voltages, determines a first intensity of the first ion and a second intensity of the second ion from the one or more mass spectra, calculates a measured ratio of the first intensity and the second intensity, compares the measured ratio to the known abundance ratio, and when the measured ratio is within a predetermined threshold of the known abundance ratio, calculates an optimum voltage for the MCP using one or more measured ratios calculated for voltages of the sequence of voltages.

2. The system of claim 1, wherein the mass range is selected to further include a background mass-to-charge ratio (m/z) value where it is known that no isotope of the known compound is located and wherein the processor further, for each voltage of the sequence of voltages, determines a background intensity for the background m/z value from the one or more mass spectra and subtracts the background intensity from the first intensity and the second intensity before calculating the measured ratio.

3. The system of claim 1, wherein the processor calculates a measured ratio of the first intensity and the second intensity and compares the measured ratio to the known abundance ratio by calculating a percent isotope abundance error from the measured ratio and the known abundance ratio.

4. The system of claim 3, wherein the percent isotope abundance error comprises ((the measured ratio−the known abundance ratio)/the known abundance ratio)×100.

5. The system of claim 3, wherein the measured ratio is within a predetermined threshold of the known abundance ratio when the percent isotope abundance error is below a target percent abundance error for two or more consecutive voltages of the sequence of voltages.

6. The system of claim 5, wherein the processor calculates an optimum voltage for the MCP using one or more measured ratios calculated for voltages of the sequence of voltages by calculating a linear fit of the calculated percent isotope abundance error values for at least the last four voltages of the sequence of voltages and calculating the optimum voltage as a voltage where the linear fit produces the target percent abundance error.

7. The system of claim 6, wherein the target percent abundance error comprises −12%.

8. The system of claim 6, wherein the received second intensity includes a correction for single ion losses, and wherein the target percent abundance error comprises 0%.

9. The system of claim 1, wherein the mass spectrometer performs mass spectrometry (MS) and the one or more mass spectra comprise precursor ion mass spectra.

10. The system of claim 1, wherein the mass spectrometer performs mass spectrometry/mass spectrometry (MS/MS) by, after selecting the mass range and before mass analyzing the mass range, further fragmenting the mass range and the one or more mass spectra comprise product ion mass spectra.

11. The system of claim 1, wherein each voltage of the sequence of voltages includes an initial voltage, $V_i$.

12. The system of claim 11, wherein the mass spectrometer further, before mass analyzing the mass range, calculating the initial voltage, $V_i$, by stepping through an initial sequence of one or more different increasing bias voltages applied to the MCP and measuring a total ion current (TIC) for each voltage of the initial sequence of voltages using the MCP and the processor further, for each voltage of the initial sequence of voltages, receives the measured TIC, compares the TIC to an immediately preceding measured TIC, and when the measured TIC is within a predetermined TIC threshold of the immediately preceding measured TIC, calculates the initial voltage, Vi, as the voltage of the initial sequence of voltages used to obtain the measured TIC.

13. The system of claim 1, wherein the mass spectrometer controls the ion beam so that the MCP detects only multiple-ion strikes for the first ion and only single-ion strikes for the second ion by adjusting attenuation of the ion beam until an intensity of the first ion measured by the MCP is within a predetermined range known to produce only multiple-ion strikes for the first ion and only single-ion strikes for the second ion.

14. A method for calculating an optimum bias voltage for a microchannel plate (MCP) detector of a mass spectrometer, comprising:

continuously receiving and ionizing a calibration sample that includes a known compound that has at least a first isotope and a second isotope with a known abundance ratio using an ion source device, producing an ion beam;

receiving the ion beam, selecting and mass analyzing a mass range that includes a first ion of the first isotope and a second ion of the second isotope, controlling the ion beam so that an MCP detector detects only multiple-ion strikes for the first ion and only single-ion strikes for the second ion, and producing one or more mass spectra for the mass range as a bias voltage of the MCP is stepped through a sequence of one or more different voltages that affect the number of the first ion and the number of the second ion that the MCP detects using a mass spectrometer that includes the MCP; and, for each voltage of the sequence of voltages, determining a first intensity of the first ion and a second intensity of the second ion from the one or more mass spectra, calculating a measured ratio of the first intensity and the second intensity, comparing the measured ratio to the known abundance ratio, and, when the measured ratio is within a predetermined threshold of the known abundance ratio, calculating an optimum voltage for the MCP using one or more measured ratios calculated for voltages of the sequence of voltages using a processor.

15. A computer program product, comprising a non-transitory tangible computer-readable storage medium whose contents include a program with instructions being executed on a processor so as to perform a method for calculating an optimum bias voltage for a microchannel plate (MCP) detector of a mass spectrometer, comprising:

providing a system, wherein the system comprises one or more distinct software modules, and wherein the distinct software modules comprise a control module and an analysis module;

instructing an ion source device to continuously receive and ionize a calibration sample that includes a known compound that has at least a first isotope and a second isotope with a known abundance ratio using the control module, producing an ion beam;

instructing a mass spectrometer that includes an MCP detector to receive the ion beam, select and mass analyze a mass range that includes a first ion of the first isotope and a second ion of the second isotope, control the ion beam so that the MCP detects only multiple-ion strikes for the first ion and only single-ion strikes for the second ion, and produce one or more mass spectra for the mass range as a bias voltage of the MCP is stepped through a sequence of one or more different voltages that affect the number of the first ion and the number of the second ion that the MCP detects using the control module; and, for each voltage of the sequence of voltages, determining a first intensity of the first ion and a second intensity of the second ion from the one or more mass spectra, calculating a measured ratio of the first intensity and the second intensity, comparing the measured ratio to the known abundance ratio, and, when the measured ratio is within a predetermined threshold of the known abundance ratio, calculating an optimum voltage for the MCP using one or more measured ratios calculated for voltages of the sequence of voltages using the analysis module.

* * * * *